US007613665B2

(12) United States Patent
Chen et al.

(10) Patent No.: US 7,613,665 B2
(45) Date of Patent: Nov. 3, 2009

(54) ENSEMBLES OF NEURAL NETWORKS WITH DIFFERENT INPUT SETS

(75) Inventors: Dingding Chen, Plano, TX (US); John A. Quirein, Georgetown, TX (US); Harry D. Smith, Jr., Montgomery, TX (US); Syed Hamid, Dallas, TX (US); Jeffery L. Grable, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 397 days.

(21) Appl. No.: 11/165,892

(22) Filed: Jun. 24, 2005

(65) Prior Publication Data

US 2007/0011114 A1    Jan. 11, 2007

(51) Int. Cl.
*G06E 1/00* (2006.01)
*G06E 3/00* (2006.01)
(52) U.S. Cl. .......................................... 706/16; 706/20
(58) Field of Classification Search ............... 706/16, 706/15, 20; 700/47, 48
See application file for complete search history.

(56) References Cited

U.S. PATENT DOCUMENTS

| 3,802,259 | A | 4/1974 | Echels |
| 3,946,226 | A | 3/1976 | Smith, Jr. |
| 3,975,157 | A | 8/1976 | Smith |
| 4,055,763 | A | 10/1977 | Antkiw |
| 4,122,240 | A | 10/1978 | Banas et al. |
| 4,122,339 | A | 10/1978 | Smith, Jr. et al. |
| 4,122,340 | A | 10/1978 | Smith, Jr. et al. |
| 4,239,965 | A | 12/1980 | Oliver et al. |
| 4,293,933 | A | 10/1981 | Park et al. |
| 4,297,575 | A | 10/1981 | Smith, Jr. et al. |
| 4,430,567 | A | 2/1984 | Oliver et al. |

(Continued)

FOREIGN PATENT DOCUMENTS

JP    04089998    3/1992

(Continued)

OTHER PUBLICATIONS

Quirein, J. A., et al., "An Assessment of Neural Networks Applied to Pulsed Neutron Data for Predicting Open Hole Triple Combo Data", SPWLA 44th Annual Logging Symposium, 2003.*

(Continued)

*Primary Examiner*—David R Vincent
*Assistant Examiner*—Adrian L Kennedy (57) ABSTRACT

Methods of creating and using robust neural network ensembles are disclosed. Some embodiments take the form of computer-based methods that comprise receiving a set of available inputs; receiving training data; training at least one neural network for each of at least two different subsets of the set of available inputs; and providing at least two trained neural networks having different subsets of the available inputs as components of a neural network ensemble configured to transform the available inputs into at least one output. The neural network ensemble may be applied as a log synthesis method that comprises: receiving a set of downhole logs; applying a first subset of downhole logs to a first neural network to obtain an estimated log; applying a second, different subset of the downhole logs to a second neural network to obtain an estimated log; and combining the estimated logs to obtain a synthetic log.

34 Claims, 5 Drawing Sheets

U.S. PATENT DOCUMENTS

| | | | |
|---|---|---|---|
| 4,605,854 | A | 8/1986 | Smith, Jr. |
| 4,617,825 | A | 10/1986 | Ruhovets |
| 4,645,926 | A | 2/1987 | Randall |
| 4,646,240 | A | 2/1987 | Serra et al. |
| 4,656,354 | A | 4/1987 | Randall |
| 4,912,655 | A | 3/1990 | Wood |
| 4,926,488 | A | 5/1990 | Nadas et al. |
| 5,112,126 | A | 5/1992 | Graebner |
| 5,251,286 | A * | 10/1993 | Wiener et al. ............... 706/20 |
| 5,374,823 | A | 12/1994 | Odom |
| 5,444,619 | A | 8/1995 | Hoskins et al. |
| 5,461,698 | A | 10/1995 | Schwanke et al. |
| 5,465,321 | A | 11/1995 | Smyth |
| 5,469,404 | A | 11/1995 | Barber et al. |
| 5,475,509 | A | 12/1995 | Okamoto |
| 5,517,854 | A | 5/1996 | Plumb et al. |
| 5,525,797 | A | 6/1996 | Moake |
| 5,608,215 | A | 3/1997 | Evans |
| 5,828,981 | A * | 10/1998 | Callender et al. ............ 702/6 |
| 5,848,379 | A | 12/1998 | Bishop |
| 5,862,513 | A | 1/1999 | Mezzatesta et al. |
| 5,870,690 | A | 2/1999 | Frenkel et al. |
| 5,875,284 | A | 2/1999 | Watanabe et al. |
| 5,900,627 | A | 5/1999 | Odom et al. |
| 5,940,777 | A | 8/1999 | Keskes |
| 6,044,327 | A | 3/2000 | Goldman |
| 6,092,017 | A | 7/2000 | Ishida et al. |
| 6,140,816 | A | 10/2000 | Herron |
| 6,150,655 | A | 11/2000 | Odom |
| 6,192,352 | B1 | 2/2001 | Alouani et al. |
| 6,207,953 | B1 | 3/2001 | Wilson |
| 6,216,134 | B1 | 4/2001 | Heckerman et al. |
| 6,272,434 | B1 | 8/2001 | Wisler et al. |
| 6,295,504 | B1 | 9/2001 | Ye et al. |
| 6,311,591 | B1 | 11/2001 | Grossmann et al. |
| 6,317,730 | B1 | 11/2001 | Neuneier et al. |
| 6,374,185 | B1 | 4/2002 | Taner et al. |
| 6,381,591 | B1 | 4/2002 | Hoffmann et al. |
| 6,411,903 | B2 | 6/2002 | Bush |
| 6,424,956 | B1 | 7/2002 | Werbos |
| 6,456,990 | B1 | 9/2002 | Hoffmann et al. |
| 6,466,893 | B1 | 10/2002 | Latwesen et al. |
| 6,760,716 | B1 | 7/2004 | Ganesamoorthi et al. |
| 6,789,620 | B2 | 9/2004 | Schultz et al. |
| 2002/0147695 | A1 | 10/2002 | Khedkar et al. |
| 2002/0152030 | A1 | 10/2002 | Schultz et al. |
| 2002/0165911 | A1 | 11/2002 | Gabber et al. |
| 2002/0170022 | A1 | 11/2002 | Shirai et al. |
| 2002/0177954 | A1 | 11/2002 | Vail, III |
| 2002/0178150 | A1 | 11/2002 | Hytopoulos et al. |
| 2002/0183932 | A1 | 12/2002 | West et al. |
| 2002/0187469 | A1 | 12/2002 | Kolodner et al. |
| 2002/0188424 | A1 | 12/2002 | Grinstein et al. |
| 2003/0115164 | A1 | 6/2003 | Jeng et al. |
| 2004/0019427 | A1 | 1/2004 | San Martin |
| 2004/0117121 | A1 * | 6/2004 | Gray et al. ................... 702/11 |
| 2004/0133531 | A1 * | 7/2004 | Chen et al. ................... 706/8 |
| 2004/0222019 | A1 | 11/2004 | Estes et al. |
| 2004/0257240 | A1 * | 12/2004 | Chen et al. ............... 340/853.1 |
| 2005/0246297 | A1 | 11/2005 | Chen et al. |
| 2007/0011114 | A1 | 1/2007 | Chen et al. |
| 2007/0011115 | A1 | 1/2007 | Smith, Jr. et al. |

FOREIGN PATENT DOCUMENTS

| | | |
|---|---|---|
| WO | WO-9964896 | 12/1999 |

OTHER PUBLICATIONS

Helle, B.H., et al., "Fluid Saturation From Sell Logs Using Committe Neural Networks", Petroluem Geoscience, 2002, vol. 8, pp. 109-118.*

Mullen, M., et al., "The Application of Neural Networks to Improve the Usability of Pulsed Neutron Logs for Evaluating Infill Well Locations in the Piceance Basin of Western Colorado and the San Juan Basin of Northwest New Mexico", SPE Rocky Mountain Technology Conference, 2001.*

Helle et al., Hans, "Fluid Saturation from Well Logs Using Committe Neural Networks", 2002.*

Quirein et al., John, "An Assessment of Neural Networks Applied to Pulsed Neutron Data for Predicting Open Hole Triple Combo Data", 2003.*

Chen, Dingding et al., U.S. Appl. No. 10/811,403, filed Mar. 26, 2004, entitled "Genetic Algorithm Based Selection Of Neural Network Ensemble For Processing Well Logging Data," pgs.

Everson, R. M. et al., Full Elite-Sets for Multi-objective Optimisation, 2002, Eight pages, Fifth International Conference on Adaptive Computing in Design and Manufacture (ACDM 2002).

Gaspar-Cunha, A., RPSGAe—Reduced Pareto Set Genetic Algorithm: A Multiobjective Genetic Algorithm with Elitism, Nov. 2002, Six pages, Workshop on Multiple Objective Metaheuristics, Carre des Sciences, Paris, France.

Hansen, L.K. et al., "Neural Network Ensembles," IEEE Transactions On Pattern Analysis and Machine Intelligence, vol. 12, No. 10, 1990, pp. 993-1001.

Helle, B.H. et al., "Fluid Saturation From Well Logs Using Committee Neural Networks," Petroleum Geoscience, 2002, vol. 8, pp. 109-118.

Islam, M. M. et al., "A Constructive Algorithm For Training Cooperative Neural Network Ensembles," IEEE Transactions On Neural Networks, 2003, vol. 14, No. 4, pp. 820-834.

Krough, A. et al., "Neural Network Ensembles, Cross Validation, And Active Learning," Advances In Neural Information Processing Systems 7, Cambridge, MA., MIT Press, 1995, pp. 231-238.

Liu, Y. et al., "Ensemble Learing Via Negative Correlation," Neural Networks, vol. 12, 1999, pp. 1399-1404.

Mullen, M. et al., "The Application Of Neural Networks To Improve The Usability Of Pulsed Neutron Logs For Evaluating Infill Well Locations In The Piceance Basin Of Western Colorado And The San Juan Basin Of Northwest New Mexico," SPE Rocky Mountain Petroleum Technology Conference, 2001, Keystone, Colorado, 14 pgs.

Quirein, J. A., et al., "An Assestment Of Neural Networks Applied To Pulsed Neutron Data For Predicting Open Hole Triple Combo Data," SPWLA 44th Annual Logging Symposium, 2003, 14 pgs.

Zhou, Z. et al., "Genetic Algorithm Based Selective Neural Network Ensemble," Proceedings Of The 17th International Joint Conference On Artificial Intelligence, vol. 2, 2001, pp. 797-802.

Streeter, R.W. et al., "Cased Hole Exploration: Modem Pulsed Neutron Techniques For Locating By-Passed Hydrocarbons In Old Wells," SPE 35162, SPE Permian Basin Oil & Gas Recovery Conference, Mar. 27-29, 1996, pp. 167-176, Midland, Texas.

Anonymous, "Log Interpretation Charts," Dresser Atlas, Dresser Industries, Inc., USA, Jun. 1983, 2 pages.

Tittman, J. et al., "The Physical Foundations Of Formation Density Logging (Gamma Gamma)," Goephysics, vol. XXX, No. 2, Apr. 1965, pp. 284-293.

Odom, Richard C. et al., "A New 1.625" Diameter Pulsed Neutron Capture And Inelastic/Capture Spectral Combination System Provides Answers In Complex Reservoirs," SPWLA 35th Annual Logging Symposium, Jun. 1994, 19 pages.

Odom, Richard C., Program And Pertinent Slides From A Presentation by Richard C. Odom at SIAM Symposium On Inverse Problems: Geophysical Applications, Dec. 17, 1995, 5 pages.

Randall, Russel R. et al., "PDK-100 Log Examples In The Gulf Coast," 26th Annual SPWL Logging Symposium, Jun. 17-20, 1985, 6 pages.

Randall, Russel R. et al., "PDK-100 Enhances Interpretation Capabilities For Pulsed Neutron Capture Logs," 27th Annual SPWL Logging Symposium, Jun. 9-13, 1985, 6 pages.

Wilson, Robert D., et al., "Bulk Density Logging With High-Energy Gammas Produced By Fast Neutron Reactions With Formation Oxygen Atoms," IEEE Nuclear Science Symposium And Medical Imaging Conference Record, vol. 1, Oct. 21-28, 1995, 7 pages.

Schnieder, B.D., et al., "Using Pulsed Neutron Decay-Spectrum Data And Multi-Inflatable Packer Plugdown Assemblies Improve Oil Production Rates In a Mature CO2 Flood," SPE 35165, SPE Permian Basin Oil & Gas Recovery Conference, Mar. 27-29, 1996, pp. 167-176, Midland, Texas.

Odom, R.C. et al., "Applications And Derivation Of A New Cased-Hole Density Porosity In Shaly Sands," SPE 38699, SPE Annual Technical Conference and Exhibition, Oct. 5-8, 1997, pp. 475-487, San Antonio, Texas.

Odom, R.C. et al., "Shaly Sand Analysis Using Density-Neutron Porosities From A Cased-Hole Pulsed Neutron System," SPE 55641, SPE Rocky Mountain Regional Meeting, May 15-18, 1999, 10 pages, Gillette, Wyoming.

Odom, R.C. et al., "A Pulsed Neutron Analysis Model For Carbon Dioxide Floods: Application To The Reinecke Field, West Texas," SPE 59717, SPE Permian Basin Oil & Gas Recovery Conference, Mar. 21-23, 2000, 4 pages, Midland, Texas.

Odom, R.C. et al., "Examples Of Cased Reservoir Analysis In The Ventura Basin, California," SPE 62850 SPE/AAPG Western Regional Meeting, Jun. 19-23, 2000, 7 pages, Long Beach, California.

Odom, R.C. et al., "Assessing The Capabilities Of A Cased-Hole Reservoir Analysis System In The Gulf Of Thailand," SPE 64404, SPE Asia Pacific Oil And Gas Conference And Exhibition, Oct. 16-18, 2000, 10 pages, Brisbane, Australia.

Odom, R.C. et al., "Log Examples With A Prototype Three-Detector Pulsed-Neutron System For Measurement Of Cased-Hole Neutron And Density Porosities," SPE 71042, SPE Rocky Mountain Petroleum Technology Conference, May 21-23, 2001, Keystone, Colorado, 10 pages.

Odom, R.C. et al., "Improvements In A Through-Casing Pulsed-Neutron Density Log," SPE 71742, SPE Annual Technical Conference And Exhibition, Sep. 30-Oct. 3, 2001, New Orleans, Louisiana, 9 pages.

"International Search Report and Written Opinion", dated Dec. 3, 2004, Serial No. PCT/US03/41239, "Neural Network Training Data Selection Using Memory Reduced Cluster Analysis for Field Model Development", filed Dec. 23, 2003.

"International Search Report and Written Opinion", Dated Jul. 3, 2008, Serial No. PCT/US06/21158, "Ensembles of Neural Networks with Different Input Sets", filed Jun. 1, 2006.

"International Search Report and Written Opinion", dated Mar. 20, 2008, Serial No. PCT/US05/09494, "Genetic Algorithm Based Selection of Neural Network Ensemble for Processing Well Logging Data", filed Mar. 22, 2006.

"International Search Report and Written Opinion", dated Mar. 21, 2007, Serial No. PCT/US006/25029, Well Logging with Reduced Usage of Radiosotopic Sources, filed Jun. 26, 2006.

"US Advisory Action", dated Oct. 17, 2006, U.S. Appl. No. 10/393,641, "Neural Network Training Data Selection Using Memory Reduced Cluster Analysis for Field Model Development", filed Jun. 8, 2006.

"US Final Office Action", dated Dec. 5, 2007, U.S. Appl. No. 10/393,641, "Neural Network Training Data Selection Using Memory Reduced Cluster Analysis for Field Model Development", filed Jun. 8, 2006.

"US Final Office Action", dated Jun. 8, 2006, U.S. Appl. No. 10/393,641, "Neural Network Training Data Selection Using Memory Reduced Cluster Analysis for Field Model Development", filed Jun. 8, 2006.

"US Final Office Action", dated May 7, 2007, U.S. Appl. No. 10/811,403, "Genetic Algorithm Based Selection of Neural Network Ensemble for Processing Well Logging Data", filed Mar. 26, 2004.

"US Final Office Action", dated Nov. 24, 2008, U.S. Appl. No. 11/165,892, Ensembles of Neural Networks with Different Input Sets, filed Jun. 24, 2005.

"US Non-Final Office Action", dated Aug. 28, 2007, U.S. Appl. No. 11/165,892, "Ensembles of Neural Networks with Different Input Sets": filed Jun. 24, 2005.

"US Non-Final Office Action", dated Jan. 20, 2006, U.S. Appl. No. 10/393,641, "Neural Network Training Data Selection Using Memory Reduced Cluster Analysis for Field Model Development", filed Jun. 8, 2006.

"US Non-Final Office Action", dated Jul. 9, 2007, U.S. Appl. No. 10/393,641, "Neural Network Training Data Selection Using Memory Reduced Cluster Analysis for Field Model Development", filed Jun. 8, 2006.

"US Non-Final Office Action", dated Jun. 8, 2007, U.S. Appl. No. 11/270,284, "Well Logging with Reduced Usage of Radiosotopic Sources", filed Nov. 9, 2005.

"US Non-Final Office Action", dated Mar. 20, 2008, U.S. Appl. No. 11/270,284, "Well Logging with Reduced Usage of Radiosotopic Sources", filed Nov. 9, 2005.

"US Non-Final Office Action", dated Nov. 24, 2008, U.S. Appl. No. 11/270,284, PCT/US006/25029, "Well Logging with Reduced Usage of Radiosotopic Sources", filed Nov. 9, 2005.

"US Non-Final Office Action", dated Oct. 20, 2006, U.S. Appl. No. 10/811,403, "Genetic Algorithm Based Selection of Neural Network Ensemble for Processing Well Logging Data", filed Mar. 26, 2004.

"US Non-Final Office Action", Non-Final Office Action dated Jun. 8, 2007, U.S. Appl. No. 11/270,284, "Well Logging with Reduced Usage of Radiosotopic Sources", filed Nov. 9, 2005.

Abbass, "Pareto Neuro-Evolution: Constructing Ensemble of Neural Networks Using Multi-Objective Optimization", Congress on Evolutionary Computation, Canberra, Australia, (2003), pp. 2074-2080.

Brown, "Diversity Creation Methods: A Survey and Categorization", Journal of Information Fusion, vol. 6, No. 1, (Jan. 2005), pp. 5-20.

Brown, G. et al., "Negative Correlation Learning and the Ambiguity Family of Ensemble Methods", Springer-Verlag Berlin Heidelberg, (2003), pp. 266-275.

Castillo, "Multiobjective Optimization of Ensembles of Multilayer Perceptrons for Pattern Classification", Parallel Problem Solving from Nature IX, Iceland, (2006), pp. 453-462.

Chakraborti, N. et al., "A Study of the Cu Clusters Using Gray-coded genetic algorithms and differential evolution", Journal of Phase Equilibria and Diffusion, vol. 25, No. 1, (2004), pp. 16-21.

Chandra, "Divace: Diverse and Accurate Ensemble Learning Algorithm", The Fifth International Conference on Intelligent Data Engineering and Automated Learning, Exeter, UK, (2004), pp. 619-625.

Chen, Dingding "Neural Network Ensemble Selection Using a Multi-Objective Genetic Algorithm in Processing Pulsed Neutron Data", Petrophysics, vol. 46, No. 5, (Oct. 2005), pp. 323-334.

Chen, Dingding "Variable Input Neural Network Ensembles in Generating Synthetic Well Logs", International Joint Conference on Neural Networks, Vancouver, BC, Canada, (2006), pp. 2273-2280.

Chen, Dingding et al., "Neural Network Training-Data Selection Using Memory-Reduced Cluster Analysis for Field Model Development", SPE 80906; Society of Petroleum Engineers, SPE Production and Operation Symposium, Oklahoma City, OK, (Mar. 23, 2003), 5 pages.

Coelho, "The Influence of the Pool of Candidates on the Performance of Selection and Combination Techniques in Ensembles", International Joint Conference on Neural Networks, Vancouver, BC, Canada, (2006), pp. 10588-10595.

Dutta, "A Hybrid Ensemble Model of Kriging and Neural Networks for Ore-Grade Estimation", International Journal of Surface Mining, Reclamation and Environment, vol. 20, No. 1, (2006),pp. 22-45.

Everson, R.M. et al., "Full Elite-Sets for Multi-objective Optimization", Fifth Int'l Conf. on Adaptive Computing in Design and Manufacture, ((ACDM 2002)), 8 pages.

Fung, "Modular Artificial Neural Network for Prediction of Petrophysical Properties from Well Log Data", IEEE Instrumentation and Measurement Technology Conference, Brussels, Belgium, (Jun. 1996). 1010-1014.

Gaspar-Cunha, A. "RPSGAe-Reduced Pareto Set Genetic Algorithm: A Multiobjective Genetic Algorithm with Elitism", Workshop on Multiple Objective Metaheuristics, Carre des Sciences, Paris, France, (Nov. 2002), 6 pages.

Granitto, P.M. et al., "Modeling of Sonic Logs in Oil Wells with Neural Network Ensembles", Argentine Symposium on Artificial Intelligence (ASA! '01), Bs. As., http:/citeseer.ist.psu.edu/granitto01modeling.html, (Sep. 12, 2001), 7 pages.

Halliburton Energy Services, Inc, U.S. Appl. No. 11/165,892, "Ensembles of Neural Networks with Different Input Sets", filed Jun. 24, 2005.

Halliburton Energy Services, Inc, U.S. Appl. No. 10/393,641, "Neural Network Training Data Selection Using Memory Reduced Cluster Analysis for Field Model Development", filed Mar. 21, 2003.

Halliburton Energy Services, Inc, U.S. Appl. No. 10/811,403, "Genetic Algorithm Based Selection of Neural Network Ensemble for Processing Well Logging Data", filed Mar. 26, 2004.

Halliburton Energy Services, Inc, U.S. Appl. No. 11/270,284, "Well Logging with Reduced Usage of Radioisotopic Sources", filed Nov. 9, 2005.

Halliburton Energy Services, Inc, U.S. Appl. No. 12/190,418, "Systems and Methods Employing Cooperative Optimization-Based Dimensionality Reduction", filed Aug. 6, 2008.

Halliburton Energy Services, Inc. U.S. Appl. No. 12/048,045, "Neural-Network Based Surrogate Model Construction Methods and Applications Thereof", filed March 13, 2008.

Hampson, Daniel P., et al., "Use of multiattribute transforms to predict log properties from seismic data", Society of Exploration Geophysicists, Geophysics vol. 66. No. 1, (Jan. 2001), pp. 220-236.

Hamza, "Vehicle Crashworthiness Design via a Surrogate Model Ensemble and a Co-Evolutionary Genetic Algorithm", ASME International Design Engineering Technical Conferences & Computers and Information in Engineering Conference, Long Beach, California, (Sep. 24, 2005), 9 pages.

Helle, Hans B., et al., "Fluid saturation from well logs using committee neural networks", Petroleum Geoscience, vol. 8 2002, (2002), pp. 109-118.

Islam, Monirul et al., "A Constructive Algorithm for Training Cooperative Neural Network Ensembles", IEEE Transactions on Neural Networks, vol. 14, No. 4, (Jul. 2003), pp. 820-834.

Jin, "A Framework for Evolutionary Optimization with Approximate Fitness Functions", IEEE Transactions on Evolutionary Computation, vol. 6, No. 5, (2002), pp. 481-494.

Jin, "Neural Network Regularization and Ensembling Using Multi-Objective Evolutionary Algorithms", Congress on Evolutionary Computation, Portland, Oregon, (2004), 8 pages.

Krough, "Neural Network Ensembles, Cross Validation, and Active Learning", Advances in Neural Information Processing Systems 7, MIT Press, Cambridge, Maine, (1995),pp. 231-238.

Lespinats, et al., "DD-HDS: A Method for Visualization and Exploration of High-Dimensional Data", IEEE, Transactions on Neural Networks, vol. 18, No. 5, (Sep. 2007),pp. 1265-1279.

Liu, Y. et al., "Ensemble learning via negative correlation", Neural Networks, vol. 12, Issue 10, (Dec. 1999),pp. 1399-1404.

Liu, Y. et al., "Evolutionary Ensembles with Negative Correlation Learning", IEEE Transaction s on Evolutionary Computation, vol. 4, No. 4, (Nov. 2000),pp. 380-387.

Maclin, "Combining the Predictions of Multiple Classifiers: Using Competitive Learning to Initialize Neural Networks", 14th International Joint Conference on Artificial Intelligence, Montreal, Canada, (1995), pp. 524-530.

Obayashi, "Multiobjective Evolutionary Computation for Supersonic Wing-Shape Optimization", IEEE Transactions on Evolutionary Computation, vol. 4, No. 2, (2000), pp. 182-187.

Ong, "Evolutionary Optimization of Computationally Expensive Problems via Surrogate Modeling", AIAA Journal, vol. 1, No. 4, (Apr. 2003), 10 pages.

Optiz, D.W. et al., "A Genetic Algorithm Approach for Creating Neural-Network Ensembles", Combining Artificial Neural Nets, http:/citeseer.ist.psu.edu/opitz99genetic.html, Springer-Verlag, London, (1999), pp. 79-99.

Renner, "Combining Constructive Neural Networks for Ensemble Classification", AIM, Fifth Joint Conference on Information Sciences, (2000), 6 pages.

Sollich, "Learning with Ensembles: How Over-Fitting Can be Useful", in Advances in Neural 20, Information Processing Systems 8, Cambridge, MA: MIT Press, (1996), pp. 190-196.

Torres-Sospedra, "A Research on Combination Methods for Ensembles of Multilayer Feedforward", International Joint Conference on Neural Networks, Montreal, Canada, (Aug. 4, 2005), pp. 1-6.

Twomey, Janet "Committee Networks by Resampling," In Intelligent Engineering Systems through 5 Artificial Neural Networks, ASME Press, vol. 5, (1995),pp. 153-158.

Xu, Rui "Survey of Clustering Algorithms", IEEE Transactions on Neural Networks, vol. 16, No. 3, (May 2005), pp. 645-678.

Yang, "Managing Approximation Models in Multiobjective Optimization", Structure and Multidisciplinary Optimization, vol. 24, No. 2, (2002), pp. 141-156.

Zhou, Z.Hi-Hua "A Study on Polynomial Regression and Gaussian Process Global Surrogate Model in Hierarchical Surrogate-Assisted Evolutionary Alogrithm", IEEE Congress on Evolutionary Computation, Edinburgh, United Kingdom, (Sep. 2005), 6 pages.

Zhou, Zhi-Hua et al., "Genetic Algorithm based Selective Neural Network Ensemble", International Joint Conference on Artificial Intelligence, Vol. 2, Seattle, WA, (2001),pp. 797-802.

* cited by examiner

ENSEMBLES OF NEURAL NETWORKS WITH DIFFERENT INPUT SETS

CROSS REFERENCE TO RELATED APPLICATIONS

The present application relates to co-pending U.S. patent application Ser. No. 10/811,403, filed Mar. 26, 2004, and entitled "Genetic Algorithm Based Selection of Neural Network Ensemble for Processing Well Logging Data".

BACKGROUND

Neural networks are useful tools for machine learning. Inspired by studies of nerve and brain tissue, designers have created a variety of neural network architectures. In many commonly-used architectures, the neural networks are trained with a set of input signals and corresponding set of desired output signals. The neural networks "learn" the relationships between input and output signals, and thereafter these networks can be applied to a new input signal set to predict corresponding output signals. In this capacity, neural networks have found many applications including identifying credit risks, appraising real estate, predicting solar flares, regulating industrial processes, and many more.

In many applications, there are a large number of possible input parameters that can be selected in order to predict desired output parameters. Optimizing the choice of input parameters can assist in producing stable and accurate predictions. Unfortunately, the input optimization process can be difficult.

BRIEF DESCRIPTION OF THE DRAWINGS

A better understanding of the disclosed embodiments can be obtained when the following detailed description is considered in conjunction with the following drawings, in which.

While the invention is susceptible to various modifications and alternative forms, specific embodiments thereof are shown by way of example in the figures and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

The problems outlined above are at least in part addresses by the herein-disclosed methods of creating and using neural network ensembles (combinations of more than one neural network) to obtain robust performance. Some embodiments take the form of computer-based methods that comprise receiving a set of available inputs; receiving training data comprising values for the available inputs and corresponding values for at least one output; training at least one neural network for each of at least two different subsets of the set of available inputs; and providing at least two trained neural networks having different subsets of the available inputs as components of a neural network ensemble configured to transform the available inputs into at least one output.

Some embodiments provide a well log synthesis method that comprises: receiving a set of input signals that represent measurements of downhole formation characteristics; applying a first subset of the set of input signals to a first neural network to obtain one or more estimated logs; applying a second, different subset of the set of input signals to a second neural network to obtain one or more estimated logs; and combining corresponding ones of the one or estimated logs from the first and second neural networks to obtain one or more synthetic logs. More than two neural networks can be used. Each of the neural networks may also differ in ways other than the input signal subset, e.g., the neural networks may also have different complexities.

The disclosed methods may be embodied in an information carrier medium that, when placed in operable relation to a computer, provides the computer with software comprising a training process, a selection process, and a prediction process. The training process generates a pool of neural networks having diversity in inputs and in complexity. The selection process identifies an ensemble of neural networks from the pool having a desirable fitness measure, the fitness measure for each neural network ensemble being based at least in part on a measure of one or more of the following: validation error, complexity, and negative correlation. The prediction process applies the neural network ensemble to obtain a prediction of one or more estimated logs.

Figures 1, 2:
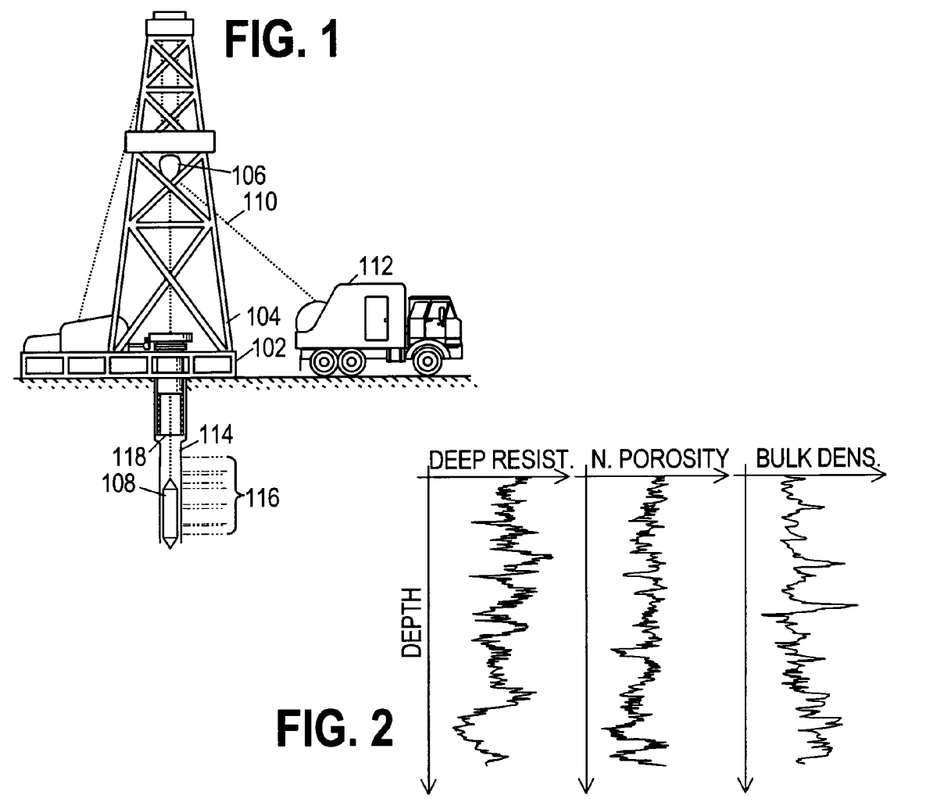
FIG. 1 is an illustrative view of a borehole logging environment.
FIG. 2 shows illustrative open hole logs.

FIG. 1 shows an illustrative borehole logging environment. A drilling platform 102 supports a derrick 104 having a traveling block 106 for raising and lowering a string of threaded drill pipe to drill the borehole 114. A logging-while-drilling (LWD) tool can be inserted in the drill string near the drill bit to gather logging information during the drilling process. Alternatively, or additionally, logging information can be gathered by a logging tool 108 that is lowered into the borehole 114 after the drill string has been removed. Logging tool 108 is suspended from traveling block 106 by a wire line 110 that couples the tool to a logging facility 112. The logging facility 112 includes computers or other recording apparatus for processing and storing information gathered by tool 108.

As borehole drilling is completed, a string of casing pipe 118 is inserted to preserve the integrity of the hole and to prevent fluid loss into porous formations along the borehole path. Typically, the casing is permanently cemented into place to maximize the borehole's longevity.

The logging information is intended to characterize formations 116 so as to locate reservoirs of oil, gas, or other underground fluids, and so as to provide data for use in field correlation studies and to assist in seismic data interpretation. Whenever possible, logging is performed in uncased ("open hole") conditions because the logging tool can achieve closer contact with the formation and because some of the desired open hole measurements are adversely affected by the casing and/or cement in a cased borehole. Three open hole logs that have proven useful for characterizing downhole formations are those shown in FIG. 2: the deep resistivity log, the neutron porosity log, and the formation density log. As shown, the logs are a plot of the measured value as a function of depth, or sometimes, a function of time or a function of position in along the borehole.

Figure 3:
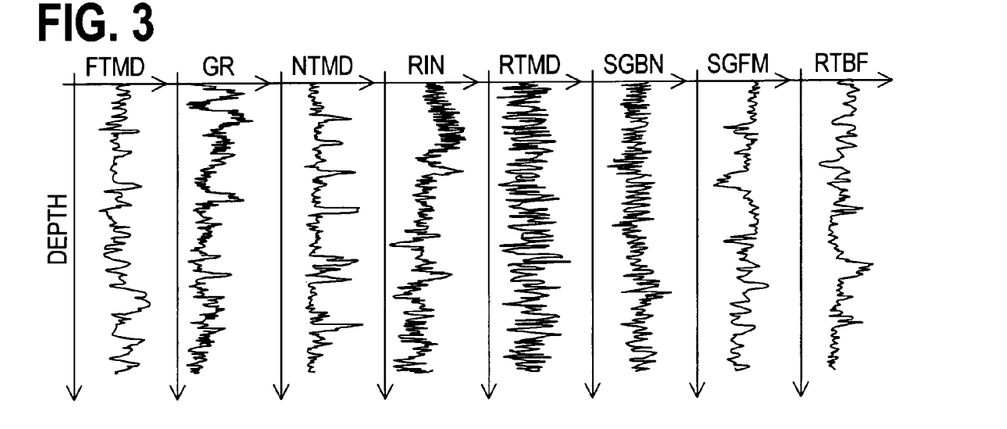
FIG. 3 shows illustrative cased hole logs.

However, it is often necessary to gather logging information after a borehole has been cased, e.g., after casing pipe 118 has been cemented in along the full length of the borehole. Because the formation is isolated from the borehole interior, logging can only be performed by a limited number of tools that can sense formation properties through the casing, e.g., acoustic logging tools or nuclear logging tools. In particular, pulsed neutron logging tools such as the pulsed neutron capture (PNC) logging tool provide a number of cased hole measurements ("logs"), including those shown in FIG. 3. The log names and acronyms are given in the following list:

FTMD—log of overall capture gamma ray count rate for far detector;

GR—log of natural gamma ray count rate;

NTMD—log of overall capture gamma ray count rate for near detector;

RIN—log of inelastic gamma ray count rate ratio between detectors;

RTMD—log of capture gamma ray count rate ratio between detectors;

SGBN—log of cross section (sigma) for borehole (near detector); and

SGFM—log of cross section (sigma) for formation (far and/or near detector);

RTBF—log of the ratio of capture count rates from the borehole relative to capture count rates from the formation.

As before, the logs are plots of measured value as a function of depth. The foregoing list is in no way exhaustive. Other logging tools and log measurements exist. Pulsed neutron logging tools may be replaced with or supplemented by, e.g., full wave sonic logging tools, natural gamma ray spectroscopy tools, cased hole resistivity logging tools, cased hole neutron logging tools, and production logging tools. Any of these may be analyzed using the normal facies workflow to identify formation conditions and find zone and curve sets with specific attributes flagged. The input logs can then be partitioned on a zone or attribute basis for analysis of data from similar environments. In any event, the list of input signal candidates is based on the particular application at hand.

Figure 4:
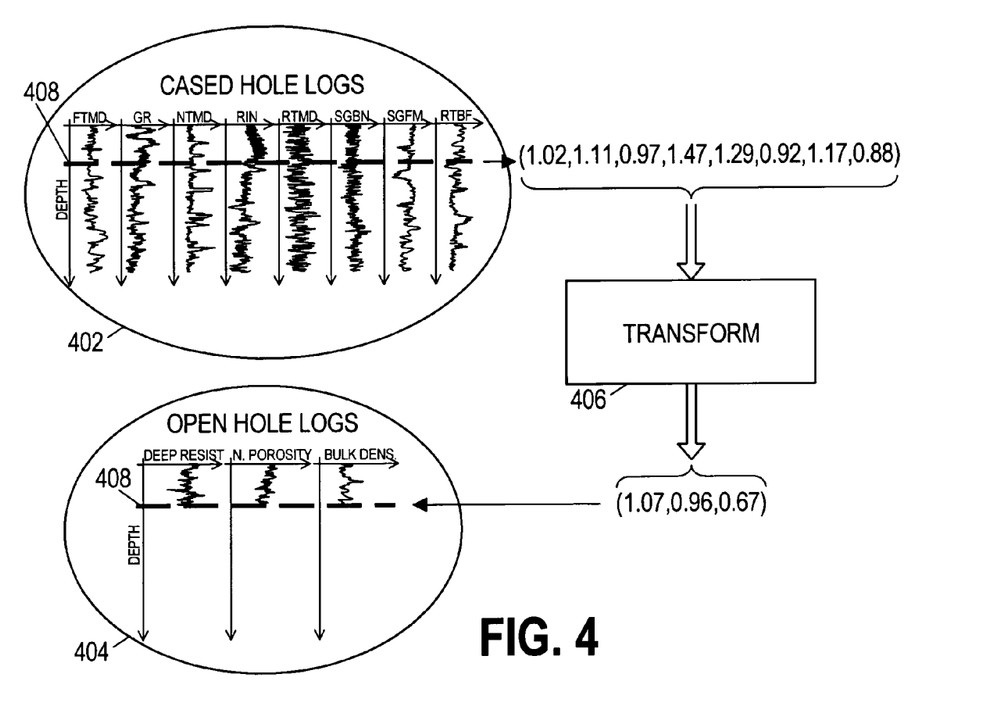
FIG. 4 shows an illustrative transform process for predicting open hole logs from cased hole logs.

Given the set of available logs from a PNC logging tool and/or other cased hole logging tools, it is desirable to convert those logs into synthetic approximations to those open hole logs that have proved useful in the past. Such a conversion also enables an apples-to-apples comparison of logs taken before and after casing the borehole, and is useful in correlating with open hole logs taken in other wells in the field. FIG. 4 shows an illustrative transformation process 406 that converts cased hole logs 402 into synthetic open hole logs 404. The foregoing transformation process is also useful for creating other synthetic logs, i.e., estimates of otherwise unavailable log information. For example, open hole logs may be transformed into synthetic magnetic resonance imaging logs that generally require the use of a very expensive tool. PNC tool measurements may be transformed into synthetic neutron and density logs (e.g., gamma-gamma density) that would otherwise require the use of tools with conventional radioactive sources.

Returning to the illustrated example, the input values to transform block 406 are those cased hole log values at a given depth 408. For this set of input values, transform block 406 produces a set of output values that are the synthetic open hole log values at the given depth 408. The open hole logs across the entire depth interval logged with the pulsed neutron tool can thus be simulated by repeating the conversion at each depth covered by the cased hole logs.

Transform block 406 may employ neural networks to perform the conversion. Because the amount of training data is limited relative to the desired operating scope, the transform block 406 may employ multiple neural networks that are combined in an ensemble to provide more robust behavior both within and outside the training region.

Figure 5:
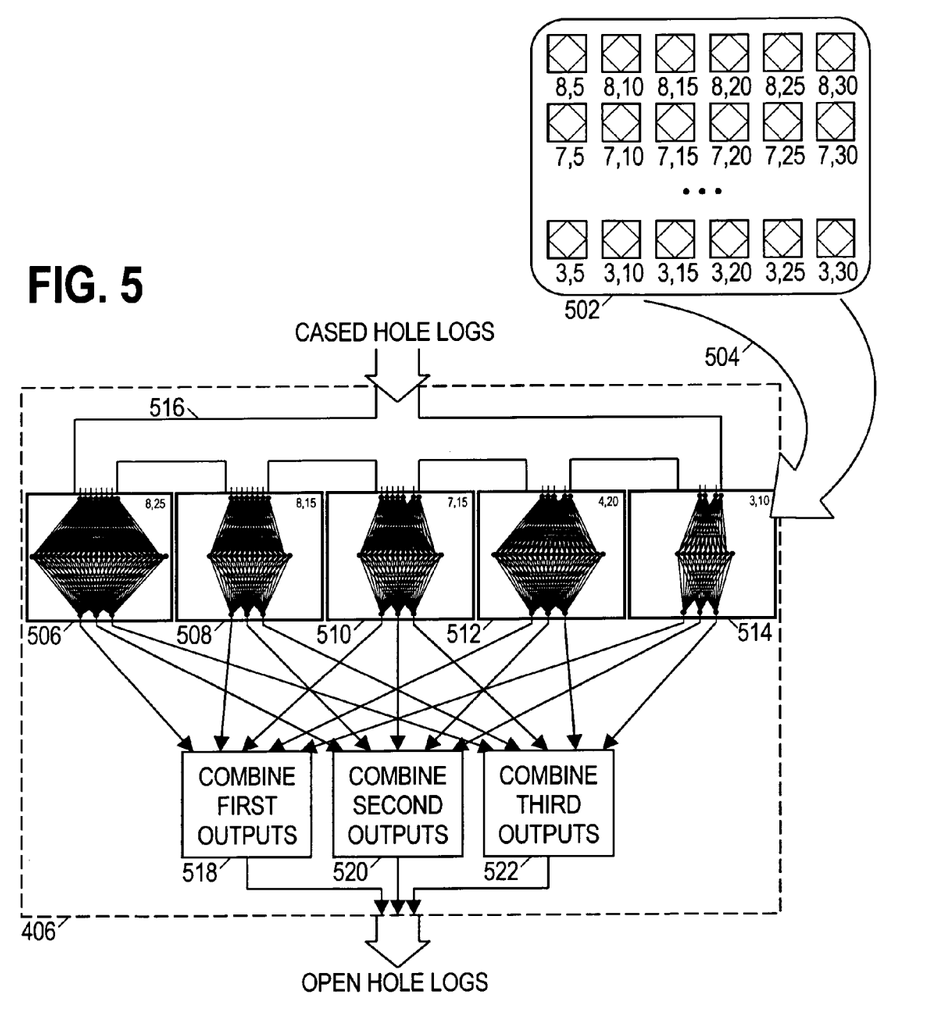
FIG. 5 shows an illustrative neural network ensemble.

FIG. 5 shows an illustrative pool of trained neural networks 502. The neural networks in the pool are diverse in at least one respect: some of the networks operate on different subsets of the available input signals. For example, one neural network in the pool may operate on a subset of three input signals such as RIN, RTMD, and SGFM, while another neural network operates on a subset of five input signals such as GR, NTMD, RIN, RTMD, and SGFM. The subsets can be disjoint or they can overlap, but experience has shown that input set diversity significantly improves the performance of transform block 406. In some preferred embodiments, the smaller subsets are always contained in the larger subsets.

In addition to being diverse in the input signals upon which they operate, the neural networks may also be diverse in other ways. For example, when the neural networks are based on a back-propagation architecture (back-propagation networks, or "BPN"), one of the architectural parameters is the number of nodes in the hidden layer. (Details regarding BPN design are widespread in the literature. See, e.g., J. A. Freeman and D. M. Skapura, *Neural Networks,* © 1991 by Addison Wesley, Chapter 3.) In some embodiments, the pool of neural networks is diverse in the number of nodes in the hidden layer. For example, each of the neural networks shown in pool 502 is accompanied by an ordered pair indicating the size of the input signal set and the number of nodes in the hidden layer (so 3,10 indicates three input signals and ten hidden nodes). Other ways to construct a pool of diverse neural networks includes: training different networks on different training data sets; training different networks on differently partitioned training data sets; training from different initial states; using different neuron functions; using different training algorithms; and/or using different architectural parameters where available.

Given a range of diverse neural networks, each network is trained in accordance with the appropriate training algorithm to obtain pool 502. A selection process 504 is then applied to assemble an optimized neural network ensemble. The transform block 406 shown in FIG. 5 comprises five neural networks 506, 508, 510, 512, and 514, drawn from pool 502. Neural network 506 operates on all eight available input signals and has 25 nodes in the hidden layer. Neural network 508 operates on all eight available input signals and has 15 nodes in the hidden layer. Neural network 510 operates on all available inputs except SGBN and has a 15 node hidden layer. Neural network 512 operates on the NTMD, RIN, RTMD, and SGFM input signals, and has a 20 node hidden layer. Finally, neural network 514 operates on the RIN, RTMD, and SGFM input signals, and has a 10 node hidden layer.

Each of the neural networks has been trained to produce three outputs, each output corresponding to one of the open hole logs. For each open hole log, a corresponding output unit 518, 520, or 522, averages the corresponding output signal from the five neural networks to produce the corresponding synthetic open hole log. In some embodiments, the output units do a straight averaging operation, while alternative embodiments perform a weighted averaging operation.

In alternative embodiments, each neural network is trained to produce a single output, with different networks being trained to produce different synthetic open hole logs. The outputs of those networks trained for a given open hole log are combined to synthesize that open hole log. In yet other ensemble embodiments, multiple-output neural networks are combined with single-output neural networks. In such embodiments, each output unit is associated with a single open hole log and accordingly combines only those neural network outputs that have been trained to predict that open hole log.

Neural network ensemble architectures such as that described above, when constructed using an appropriate pool (such as one constructed in accordance with the method described below with respect to FIG. 6) and an appropriate selection process 504 (such as that described below with respect to FIG. 7), have proven to perform better at predicting open hole logs than even the best-trained individual networks. The diversity of the component networks provide for a more robust prediction outside the training regions applied to the individual networks.

Figure 6:
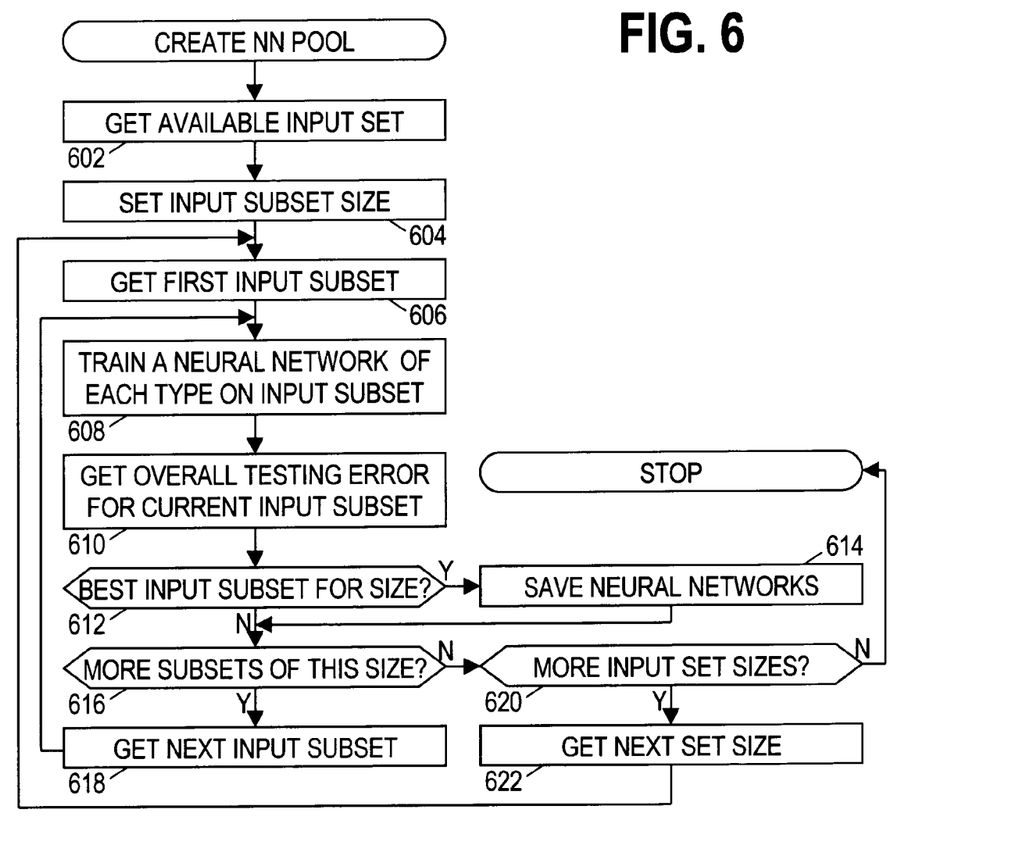
FIG. 6 shows an illustrative method of creating a pool of trained neural networks.

FIG. 6 shows an illustrative process for creating a pool of trained neural networks having a diversity of input signal sets. In block 602, the process begins with a determination of the available input signals. For example, at least eight cased hole logs are available from information gathered by a PNC logging tool. As another example, the available input signals includes the cased hole logs derived from a combination of logging tools so that, e.g., the available signals include PNC cased hole logs and one or more of the following: full wave sonic logs, cased hole neutron logs, cased hole resistivity logs, and production logs. In block 604, an input subset size is chosen. In some embodiments, the input subset size begins at one. In some alternative embodiments, the input subset size starts off equal to a user-specified number. In some embodiments, the initial input subset is also user-specified.

Blocks 606-622 form a loop that is performed for each input subset size between from the starting size to the maximum size (the number of available input signals). An inner loop, comprising blocks 608-618, is performed for each candidate input subset of the given size. The order in which the input subsets of a given size are considered is unimportant. In some embodiments, however, restrictions are placed on which input subsets of a given size are considered. For example, in some embodiments the candidate subsets of a given size include the "best" subset of the next-smaller size ("stepwise selection"). In some alternative embodiments, the direction is reversed, and the candidate input subsets are only those proper subsets of the "best" input subset of the next larger size ("reverse stepwise selection"). In yet other alternative embodiments, an exhaustive processing of all subsets of a given size is performed for each input subset size ("exhaustive search"). In still other alternative embodiments, a genetic algorithm is used as a fast approximation of the exhaustive processing alternative ("genetic input selection") when a large number of candidate inputs are available.

In block 606, a first input subset of the given size is chosen. In the first iteration of outer loop 606-622 (e.g., when the size equals 1), the candidate input subsets may be expressed as an exhaustive list of all subsets of that size that can be made from the set of available input signals. In subsequent iterations of the outer loop, the candidate input subsets may be restricted to only those subsets that include the subset determined to be best in the preceding loop iteration, i.e., stepwise selection. Thus, for example, if the first outer loop iteration determines that the best input subset of size 1 is {SGFM}, then in the second iteration of the outer loop, the candidate input subsets in some embodiments are restricted to input subsets of size 2 that include SGFM. The order in which the candidate subsets are considered is unimportant.

In block 608, one or more neural networks are trained. In those embodiments where diversity beyond input set diversity is desired, multiple neural networks are trained in block 608. For example, pool 502 (FIG. 5) included neural networks having between 5 and 30 hidden nodes. One network having each number of hidden nodes is trained in block 608 using any standard training algorithm, each network optionally being trained with a different partition of the log data. (In other words, the log data may be partitioned into training, validation, and testing data sets in multiple ways, with a different way being used for each neural network). The wells used for deriving training, validation, and testing data are called training wells. The training wells have been logged before and after being cased. In some embodiments, at least two training wells are used, with cased and open hole logs from one well (the "testing well") being reserved for later validity testing. Alternatively, the data from all wells is partitioned into training, validation, and testing sets.

The percentage of data in the training, validation, and testing sets can be varied. In some embodiments, eighty percent of each cased hole log and corresponding parts of the open hole logs are applied in a standard BPN training algorithm. Ten percent of the data from the test wells is used for validation, i.e., for early training termination if performance fails to converge. Finally, ten percent of the test well data is withheld from training for testing performance in block 610. This percentage breakdown is abbreviated as 80/10/10. Other percentage breakdowns that have yielded success are 60/15/25 and 70/10/20. These percentages are subject to change depending on the training situation.

In block 610, an overall error measurement is determined for the current input subset. In some embodiments, the overall error is based on per-network measure of squared error between predicted open hole logs and actual open hole logs. In these embodiments, the overall error is the mean of the per-network measures for the current input subset. In alternative embodiments, the performance is measured with different error functions.

In block 612, a test is made to see if the overall error for the current input subset is smaller than that of previous input subsets of the same size. If so, then in block 614, the neural networks trained for the current set of input signals are saved as the current "best". In block 616, a test is made to see if there are any more candidate subsets of the current size. If so, then in block 618, the next input subset is determined and another iteration of inner loop 608-618 is performed. Otherwise, in block 620, a test is made to see if there are any more input set sizes. If so, in block 622, the input set size is incremented, and another iteration of outer loop 606-622 is performed. If not, the process halts.

At the end of the illustrative process of FIG. 6, the neural networks for the "best" input sets of each size have been stored. These neural networks are "locally ranked", i.e., the neural networks are the best neural networks with specified sizes. In some alternative embodiments, blocks 612 and 614 may be replaced with a storing operation to save all trained neural networks from block 608 with their respective testing errors from block 610. These neural networks are "globally ranked" after all experimental input subsets are tested. Since some better-performing networks may have different input subsets of a given size, the use of globally ranked neural networks will assure that none of the promising candidates are discarded.

In addition to stepwise selection, locally ranked and globally ranked neural networks can be determined using other search techniques including reverse stepwise selection, exhaustive search, and genetic input selection. Whether locally or globally ranked, the stored neural networks are used as a starting point for a selection process 504.

Figure 7:
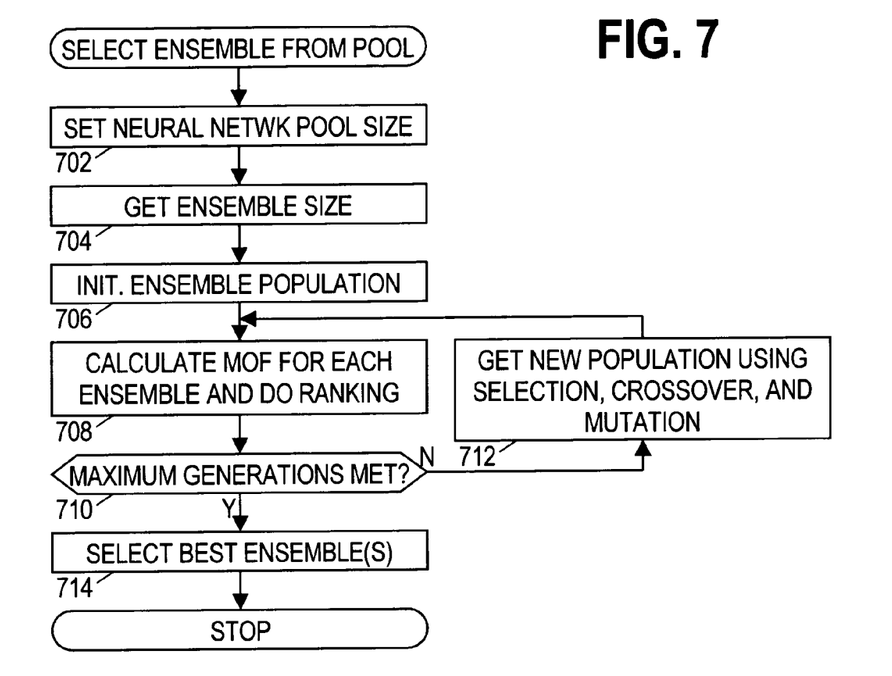
FIG. 7 shows an illustrative method of drawing from the pool to create a neural network ensemble.

FIG. 7 shows an illustrative selection process to construct and optimize a neural network ensemble. Beginning with block 702, a pool size is determined. For this illustrative selection process, the pool size is $2^n$, with n being 5, 6 or 7. Other pool sizes can be used. The pool size is set based on a trade-off between wanting to assure sufficient diversity in the pool and wanting to limit the pool to neural networks with acceptable individual performances. When using a locally ranked neural network set, sufficient diversity is available with a smaller pool size, whereas for globally ranked neural networks, larger pool sizes are desirable. In some process embodiments, the pool size is set by first finding the minimum testing error from the set of stored neural networks with the best single set of inputs. A threshold is then calculated by multiplying the minimum testing error by a scale factor in the range of, for example, about 1.1 to 1.5. The number of stored neural networks having a testing error (as a function of input subsets) below this threshold is determined, and the pool size is set to be the power of two that is larger than or equal to this number. The pool is then formed from the best-performing stored neural networks with different input subsets.

In block 704, the selection process determines the number of neural networks that will be used to construct an ensemble. This is a programmable number to be set by the user, but it is expected that to obtain the benefits of using an ensemble without incurring an excessive computational load, the number will be in the range from three to ten neural networks, with five being a default.

Given the pool and the ensemble size, different selection processes may be used to obtain and optimize the neural network ensemble. For example, the selection process may simply be selecting those networks with the best performance. In the embodiments illustrated by FIG. 7, the selection process is that described in U.S. patient application Ser. No. 10/811,403 (Halliburton 2003-IP-012537), filed Mar.26, 2004, and entitled "Genetic Algorithm Based Selection of Neural Network Ensemble for Processing Well Logging Data".

In block 706, an initial, randomly constructed population of ensembles is determined. The population size is set by the user and may be, e.g., 50 neural network ensembles. In block 708, a fitness value is determined for each neural network ensemble. In the above-referenced application, the fitness value is calculated in accordance with a multi-objective function ("MOF"), e.g., a weighted sum of: a performance measure, a complexity measure, and a negative correlation measure. Weights of each of these three components can vary in the range zero to one, with the sum of the weights equaling one. The performance measure is a mean of squared error between predicted open hole logs and actual open hole logs. The complexity measure is a sum of squared weights in the ensemble. The negative correlation measure is the average of individual negative correlation measures for the neural networks in the ensemble over multiple outputs and data samples. The individual measure of each output for a given sample is determined by finding (1) a difference between the individual neural network's output and the average neural network output of the ensemble; (2) a sum of such differences for all other neural networks in the ensemble; and (3) the product of (1) and (2). Further details can be found in the above-referenced application.

In block 710, the number of loop iterations (generations) is compared to a threshold. If the maximum number of generations is not met, then in block 712 a new population is determined. The new population is determined using genetic algorithm techniques such as removing those population members with the worst fitness values from the population, "breeding" new ensembles by combining neural networks from remaining ensembles, introducing "mutations" by randomly replacing one or more neural networks in selected ensembles, and "immigrating" new ensembles of randomly-selected neural networks.

Once the maximum number of generations is met, an ensemble is selected from the population in block 714. In some embodiments, the selected ensemble is the ensemble with the best fitness measure. In other embodiments, validity testing is performed and the selected ensemble is the ensemble with the best performance measure. Typically, after validity testing, the ensemble may be deployed for general use with similar formation conditions for converting from cased hole logs to synthetic open hole logs. In other embodiments, the training and selection processes are deployed as parts of a software package for determining customized ensembles for log conversion.

It is desirable (but not mandatory) to have complete data from at least two wells with similar formation conditions. In some embodiments, the data from one well is reserved for ensemble validity testing. In other words, the rest of the data is used for input subset selection, candidate neural network generation, and ensemble optimization (in the multi-objective function). Other embodiments use the data from one well for input subset selection and candidate neural network generation. The data from the first and second wells is then combined, with part of the combined data being used for ensemble optimization, and the remainder of the combined data being used for ensemble validity testing. In yet other embodiments, the data from one well is used for input subset selection and candidate neural network generation. The data from the second well is used for ensemble optimization, then a combined set of data is used for ensemble validity testing. In still other embodiments, part of the combined data set is used for input subset selection, candidate neural network generation, and ensemble optimization. The remainder of the combined data set is then used for ensemble validity testing.

Figure 8:
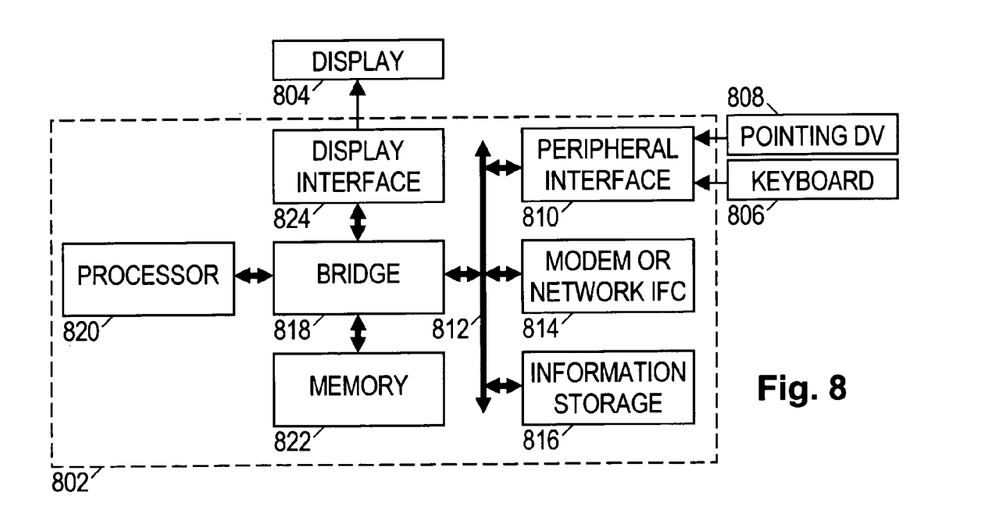
FIG. 8 shows an illustrative block diagram of a computer for implementing methods disclosed herein.

The process may be implemented as software in a general purpose desktop computer or in a high-performance server. FIG. 8 shows a simplified functional block diagram of a desktop computer 802. The computer 802 couples to a display 804 and one or more input devices such as a keyboard 806 and a pointing device 808. Software running on computer 802 configures the computer to interact with a user via the input devices and display. Information carrier media such as internal storage devices, portable disks or other storage devices, and network connections, can make such software available for execution by the computer.

Input devices 806, 808 are coupled to a peripheral interface 810 that accepts input signals and converts them into a form suitable for communications on internal bus 812. Bus 812 couples peripheral interface 810, a modem or network interface 814, and an internal storage device 816 to a bus bridge 818. Bridge 818 provides high bandwidth communications between the bus 812, a processor 820, system memory 822, and a display interface 824. Display interface 824 transforms information from processor 820 into an electrical format suitable for use by display 804.

Processor 820 gathers information from other system elements, including input data from peripheral interface 810 and program instructions and other data from memory 822, information storage device 816, or from a remote location via network interface 814. Processor 820 carries out the program instructions and processes the data accordingly. The program instructions can further configure processor 820 to send data to other system elements, including information for the user which can be communicated via the display interface 824 and the display 804.

Processor 820, and hence computer 802 as a whole, typically operates in accordance with one or more programs stored on information storage device 816. Processor 820 copies portions of the programs into memory 222 for faster access, and can switch between programs or carry out additional programs in response to user actuation of the input device. The methods disclosed herein can take the form of one or more programs executing in computer 802. Thus computer 802 can carry out the information gathering processes described with respect to FIGS. 1-3, the neural network pool creation processes described with respect to FIG. 6, the selection processes described with respect to FIG. 7, and the transformation processes described with respect to FIGS. 4-5.

Numerous variations and modifications will become apparent to those skilled in the art once the above disclosure is fully appreciated. For example, the foregoing description is made in the context of downhole log conversion. However, it should be recognized that the disclosed neural network solution design processes disclosed herein have wide applicability to all applications where neural networks can be employed. It is intended that the following claims be interpreted to embrace all such variations and modifications.

What is claimed is:

1. A method of synthesizing a well log, the method comprising:
   receiving a set of input signals that represent measurements of downhole formation characteristics;
   applying a first subset of the set of input signals to a first neural network to obtain one or more estimated logs;
   applying a second subset of the set of input signals to a second neural network to obtain one or more estimated logs, wherein the first and second subsets are distinct in that one subset has at least one input signal not included by the other; and
   combining corresponding ones of the one or more estimated logs from the first and second neural networks to output one or more synthetic logs to display to a user.

2. The method of claim 1, wherein the set of input signals represents a set of cased hole logs derived from measurements by a pulsed neutron tool.

3. The method of claim 2, wherein the pulsed neutron tool is a pulsed neutron capture tool.

4. The method of claim 2, wherein the set of input signals is derived from measurements by at least one of the following: full wave sonic logging tools, natural gamma ray spectroscopy tools, cased hole resistivity logging tools, cased hole neutron logging tools, and production logging tools.

5. The method of claim 1, wherein the set of input signals is derived from measurements by at least one of the following: full wave sonic logging tools, natural gamma ray spectroscopy tools, cased hole resistivity logging tools, cased hole neutron logging tools, and production logging tools.

6. The method of claim 1, wherein the one or more synthetic logs comprise at least one of a formation density log, a formation resistivity log, a neutron porosity log, and a magnetic resonance imaging log.

7. The method of claim 1, wherein the first and second neural networks have different values of an architectural parameter.

8. The method of claim 1, wherein the first and second neural networks are backpropagation networks with different numbers of hidden nodes.

9. The method of claim 1, wherein the second subset is a proper subset of the first subset.

10. The method of claim 1, wherein the first subset equals the set of input signals.

11. A computer-based method that generates a trained neural network ensemble, the method comprising:
    receiving a set of available inputs;
    receiving training data comprising values for the available inputs and corresponding values for at least one output;
    training at least one neural network for each of at least two different subsets of the set of available inputs, wherein the at least two different subsets are distinct in that one subset has at least one input signal from a sensor type not included in the other subset;
    providing at least two trained neural networks having different subsets of the available inputs as components of a neural network ensemble that transforms said available inputs into said at least one output, wherein said components are selected at least in part based on a measure of negative correlation between the components; and
    plotting said at least one output from the neural network ensemble as a function of at least one of time, depth, and position.

12. The computer-based method of claim 11, wherein the set of available inputs is a set of cased hole logs that can be derived from measurements by a pulsed neutron tool.

13. The computer-based method of claim 12, wherein the set of available input signals further includes cased hole logs that can be derived from measurements by at least one of the following: a full wave sonic logging tool, a natural gamma ray spectroscopy tool, a cased hole resistivity logging tool, a cased hole neutron logging tool, and a production logging tool.

14. The computer-based method of claim 11, wherein at least one output comprises at least one of a formation density log, a formation resistivity log, a neutron porosity log, and a magnetic resonance imaging log.

15. The computer-based method of claim 11, wherein said training results in a pool of trained neural networks, and wherein said providing includes:
    forming an initial population of neural network ensembles, said ensembles comprising neural networks from the pool;
    evolving the population of neural network ensembles to improve a fitness measure; and selecting an ensemble from the evolved population.

16. The computer-based method of claim 15, wherein said evolving is based on a genetic algorithm.

17. The computer-based method of claim 15, wherein the fitness measure is determined from at least one of the following: a combination of a performance measure, a complexity measure, and a negative correlation measure.

18. The computer-based method of claim 11, wherein said training results in a pool of trained neural networks, said pool having diversity in neural network inputs and neural network architectures.

19. The computer-based method of claim 18, wherein the neural networks in the pool are backpropagation networks, and wherein the architectural diversity resides in a hidden layer size.

20. The computer-based method of claim 11, wherein the training includes training at least one neural network for each of a series of different input subsets, the input subsets each being a proper subset of all subsequent input subsets in the series.

21. The computer-based method of claim 20, wherein the number of input subsets in the series is at least equal to the number of available inputs.

22. The computer-based method of claim 11, wherein the training includes determining for each input subset size a best subset of available inputs.

23. The computer-based method of claim 22, wherein the training includes constraining the input subsets tested for a best subset to those subsets that include the best subsets of smaller size.

24. The computer-based method of claim 22, wherein the training includes constraining the input subsets tested for a best subset to those subsets that are proper subsets of the best subsets of larger size.

25. The computer-based method of claim 11, wherein said training results in a locally ranked set of trained candidate neural networks.

26. The computer-based method of claim 11, wherein said training results in a globally ranked set of trained candidate neural networks.

27. The computer-based method of claim 11, wherein said training results in a set of trained neural networks, and wherein the method further comprises setting a candidate neural network pool size based on a number of trained neural networks in the set satisfying a performance measure.

28. The computer-based method of claim 27, wherein the performance measure is a prediction error threshold determined from a minimum prediction error of a set of trained neural networks for a best input subset.

29. An information storage medium that, when placed in operable relation to a computer, provides the computer with software that generates a trained neural network ensemble, the software comprising:
   a training process that generates a set of neural networks having diversity in inputs and in complexity, wherein diversity in inputs requires that at least one of the neural networks in the set operates on a different combination of input signals than another of the neural networks in the set;
   a selection process that identifies a combination of neural networks from the set having a desirable fitness measure, said fitness measure being based at least in part on a measure of negative correlation for each neural network in the combination;
   a transform process that applies the combination of neural networks in ensemble fashion to a set of inputs to synthesize at least one output; and
   a process to display said at least one output.

30. The medium of claim 29, wherein said at least one output comprises at least one of a formation density log, a formation resistivity log, a neutron porosity log, and a magnetic resonance imaging log.

31. The medium of claim 29, wherein the set of neural networks is locally ranked.

32. The medium of claim 29, wherein the set of neural networks is globally ranked.

33. The medium of claim 29, wherein the selection process forms a pool of candidate neural networks from best-performing neural networks in the set of neural networks after determining a pool size, and wherein the selection process determines a pool size based on a number of neural networks in the set that satisfy a performance measure.

34. The medium of claim 33, wherein the performance measure is a prediction error threshold determined from a minimum prediction error by a set of neural networks trained from a best input subset.

* * * * *

UNITED STATES PATENT AND TRADEMARK OFFICE
CERTIFICATE OF CORRECTION

| | | |
|---|---|---|
| PATENT NO. | : 7,613,665 B2 | Page 1 of 1 |
| APPLICATION NO. | : 11/165892 | |
| DATED | : November 3, 2009 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 766 days.

Signed and Sealed this

Nineteenth Day of October, 2010

David J. Kappos
*Director of the United States Patent and Trademark Office*